(12) United States Patent
Asano et al.

(10) Patent No.: US 10,942,394 B2
(45) Date of Patent: Mar. 9, 2021

(54) LIGHTING DEVICE AND LIQUID CRYSTAL DISPLAY DEVICE

(71) Applicant: SHARP KABUSHIKI KAISHA, Sakai (JP)

(72) Inventors: Hirofumi Asano, Sakai (JP); Yuusuke Yamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/672,905

(22) Filed: Nov. 4, 2019

(65) Prior Publication Data

US 2020/0142260 A1 May 7, 2020

Related U.S. Application Data

(60) Provisional application No. 62/755,639, filed on Nov. 5, 2018.

(51) Int. Cl.
*G02B 6/00* (2006.01)
*G02F 1/13357* (2006.01)
*F21V 8/00* (2006.01)
*G02F 1/1335* (2006.01)

(52) U.S. Cl.
CPC ..... *G02F 1/133606* (2013.01); *G02B 6/0031* (2013.01); *G02F 1/133603* (2013.01); *G02F 1/133605* (2013.01); *G02F 1/133607* (2021.01)

(58) Field of Classification Search
CPC ... G02B 6/0086; G02B 6/0091; G02B 6/0093
See application file for complete search history.

(56) References Cited

U.S. PATENT DOCUMENTS

| 9,256,102 | B1* | 2/2016 | Hsiao | G02F 1/133608 |
|---|---|---|---|---|
| 9,696,483 | B2* | 7/2017 | Kim | G02B 6/0088 |
| 2012/0120326 | A1* | 5/2012 | Takata | G02B 6/0061 |
| | | | | 348/790 |
| 2012/0242925 | A1* | 9/2012 | Watanabe | G02F 1/133308 |
| | | | | 349/58 |
| 2013/0135901 | A1* | 5/2013 | Ishimoto | G02F 1/133308 |
| | | | | 362/617 |
| 2013/0286294 | A1* | 10/2013 | Hosoki | G02F 1/133615 |
| | | | | 348/739 |

(Continued)

FOREIGN PATENT DOCUMENTS

JP 2018-101474 A 6/2018

*Primary Examiner* — Julie A Bannan
(74) *Attorney, Agent, or Firm* — ScienBiziP, P.C.

(57) ABSTRACT

A lighting device includes a light source, a light guide plate, a lower frame, an upper frame, and an elastic member. The light guide plate has a light emitting surface, and another plate surface as a back surface. The lower frame has a bottom surface portion and a side surface portion, and receives the light source and the light guide plate therein. The upper frame has a top surface portion facing the light emitting surface, a side surface portion, and a pressing portion extending toward the light guide plate from an end portion of the side surface portion of the upper frame. A clearance is formed between the top surface portion and the pressing portion. The elastic member is disposed between a side surface of the light guide plate and the side surface portion of the lower frame, and between the pressing portion and the bottom surface portion.

15 Claims, 7 Drawing Sheets

(56) References Cited

U.S. PATENT DOCUMENTS

| | | |
|---|---|---|
| 2018/0172901 A1 | 6/2018 | Arita |
| 2019/0154908 A1* | 5/2019 | Yabuuchi ............. G02B 6/0088 |
| 2020/0116915 A1* | 4/2020 | Takashima ........... G02B 6/0021 |

* cited by examiner

LIGHTING DEVICE AND LIQUID CRYSTAL
DISPLAY DEVICE

CROSS REFERENCE TO RELATED
APPLICATION

This application claims priority from U.S. Provisional Patent Application No. 62/755,639 filed on Nov. 5, 2018. The entire contents of the priority application are incorporated herein by reference.

TECHNICAL FIELD

The technology described herein relates to a lighting device and a liquid crystal display device.

BACKGROUND

Figure 7:
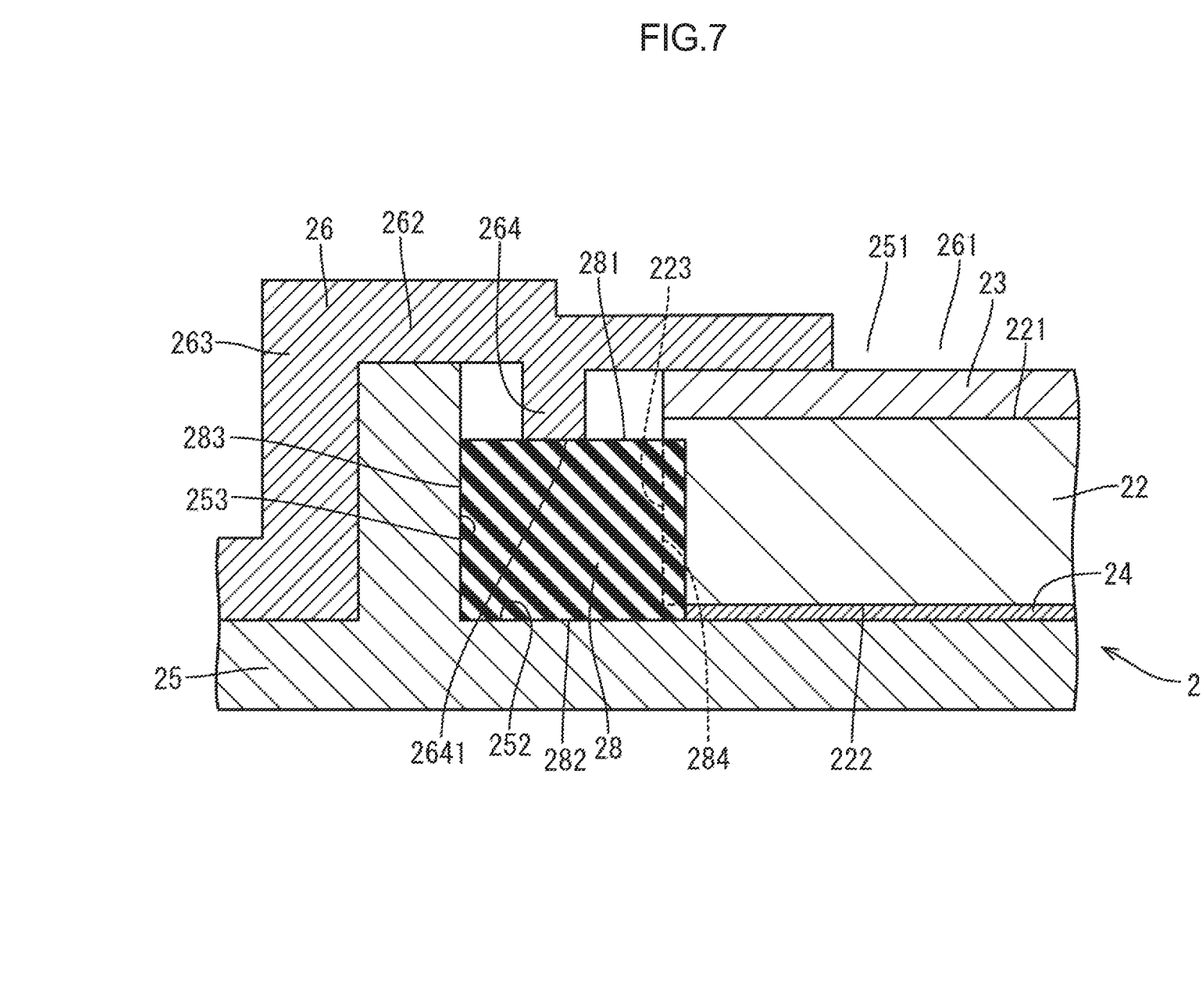
FIG. 7 is a cross-sectional view illustrating an example of a lighting device according to the related art.

As an example of a lighting device, a lighting device described in Japanese Unexamined Patent Application Publication No. 2018-101474 has been known. As illustrated in FIG. 7, when a light guide plate 22 is disposed in a lighting device (backlight) 2 disclosed in the patent document, a cushion rubber 28 abuts a side surface 223 of the light guide plate 22 and a side surface portion 253 of a lower frame 25 to be pressed (squeezed) into the light guide plate 22 and the lower frame 25. The cushion rubber 28 is disposed lower than the side surface 223 of the light guide plate 22, and is formed at a height not interfering with an optical sheet 23. A protrusion portion 264 protrudes from a top surface portion 262 of an upper frame 26 toward a top surface 281 of the cushion rubber 28 in a space between the top surface 281 of the cushion rubber 28, and the upper frame 26.

In the lighting device 2 disclosed in the patent document, when light radiated from a light source is incident on the light guide plate 22, and emitted from an opening portion 261 of the upper frame 26, a temperature of the light guide plate 22 increases due to the light source and the light emitted from the light source. The light guide plate 22 is generally formed of a resin such as an acryl, and expands as the temperature rises. The side surface 223 of the expanded light guide plate 22 presses a side surface 284 of the cushion rubber 28. Since a side surface 283 and a bottom surface 282 of the cushion rubber 28 are in contact with the lower frame 25, the cushion rubber 28 cannot move in directions in which the cushion rubber 28 is in contact with the lower frame 25. Therefore, the cushion rubber 28 is deformed and tends to expand from the top surface 281 by an amount the cushion rubber 28 is pressed by the light guide plate 22.

As a result, the protrusion portion 264 is pushed up by the cushion rubber 28 that tends to expand upward, so that the top surface portion 262 and a side surface portion 263 of the upper frame 26 are deformed.

SUMMARY

The present invention has been made in view of such a circumstance, and an object of the technology described herein is to prevent or reduce deformation of a lighting device that is caused by the temperature variation described above. Further, an object of the technology described herein is to prevent or reduce deformation of a liquid crystal display device that is caused by temperature variation.

In order to solve the problem described above, according to an embodiment of the technology described herein, a lighting device includes:

a light source;

a light guide plate having one plate surface as a light emitting surface from which light from the light source is emitted, and another plate surface as a back surface, the other surface being disposed opposite to the light emitting surface;

a lower frame having a bottom surface portion and a side surface portion rising from the bottom surface portion, and receiving the light source and the light guide plate therein;

an upper frame having a top surface portion facing the light emitting surface of the light guide plate, and a side surface portion rising from the top surface portion, and engaged with the lower frame; and an elastic member disposed between a side surface of the light guide plate and the side surface portion of the lower frame.

The upper frame includes a pressing portion extending toward the light guide plate from an end portion of the side surface portion of the upper frame, the elastic member is disposed between the pressing portion and the bottom surface portion, and a clearance is formed between the top surface portion and the pressing portion.

With such a configuration of the lighting device, it is possible to prevent or reduce deformation caused by temperature variation.

According to an embodiment of the technology described herein, a liquid crystal display device includes a liquid crystal panel and the lighting device. The lighting device is disposed on a back surface side of a liquid crystal panel. With such a configuration of the liquid crystal display device, it is possible to prevent or reduce deformation caused by temperature variation.

It is possible to prevent or reduce deformation of the lighting device that is caused by temperature variation. Further, it is possible to prevent or reduce deformation of the liquid crystal display device that is caused by temperature variation.

DETAILED DESCRIPTION (Embodiment)
<Display Device 1>

Figure 1:
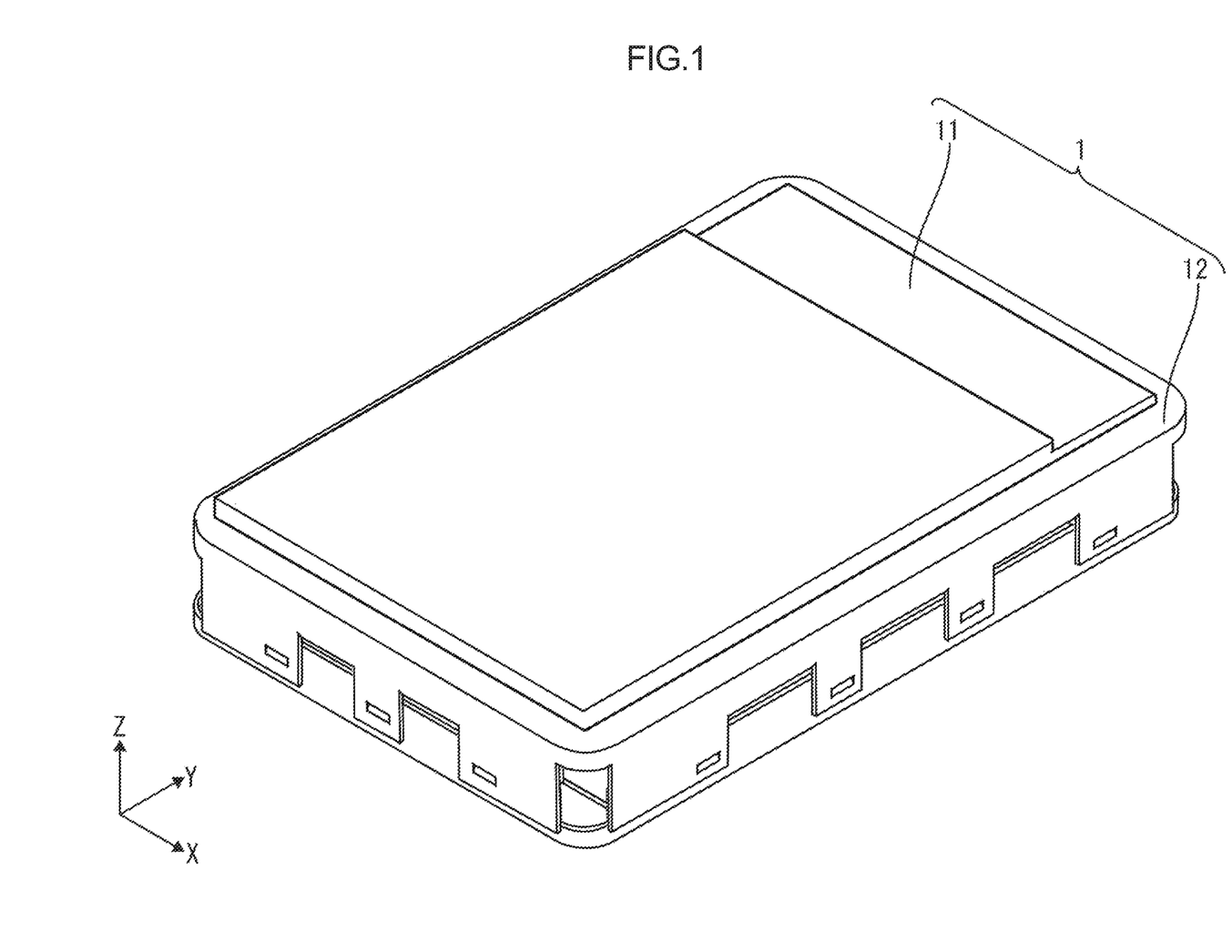
FIG. 1 is a perspective view illustrating a liquid crystal display device according to an embodiment.
Figure 2:
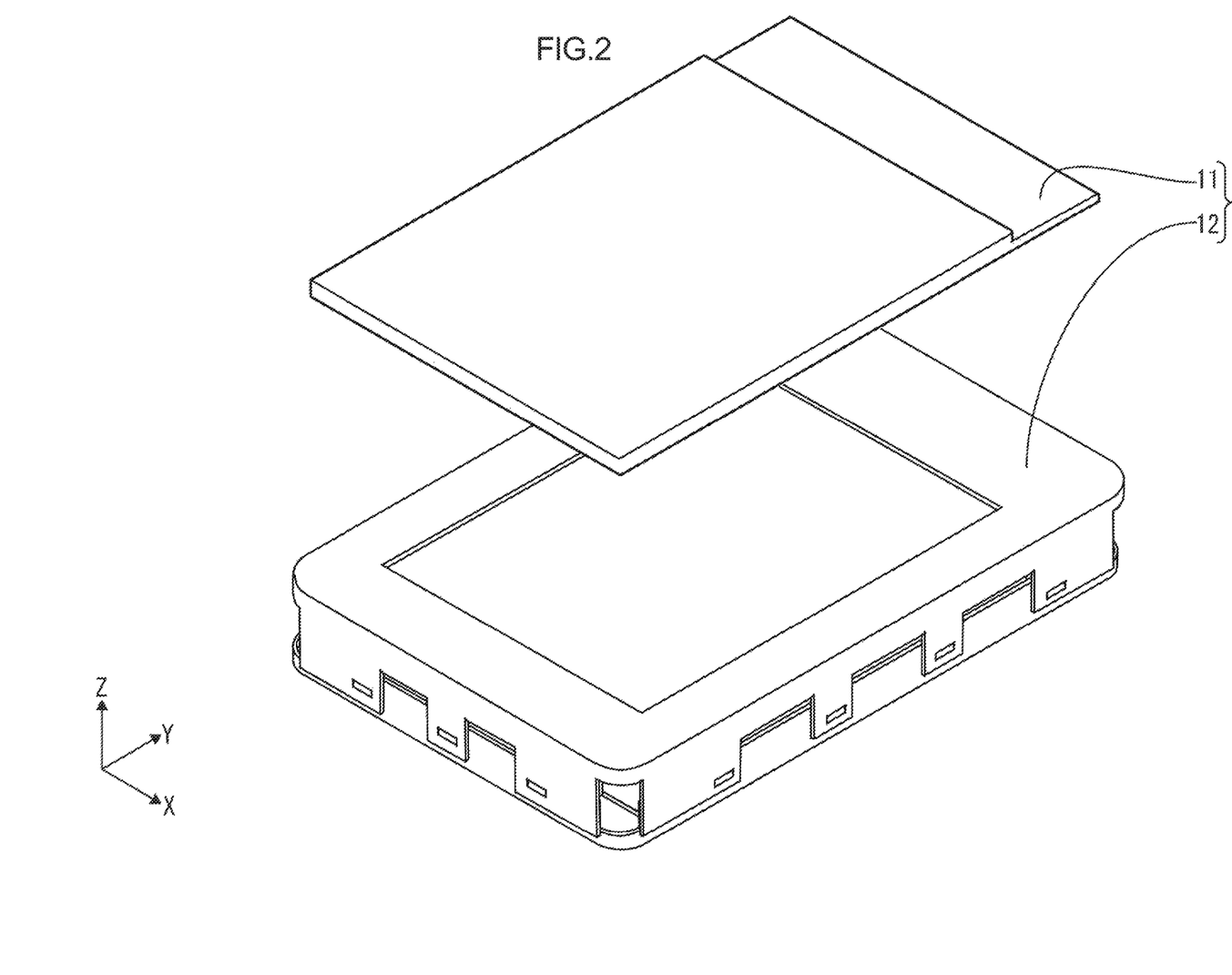
FIG. 2 is an exploded perspective view illustrating the liquid crystal display device according to an embodiment.

FIG. 1 is a perspective view illustrating a display device (liquid crystal display device) 1 according to an embodiment of the technology described herein. FIG. 2 is an exploded perspective view illustrating the display device 1. In the present description, a surface facing a side on which a display screen which displays an image is present is referred to as a front surface, and a surface facing a side opposite to the side on which the display screen is present is referred to as a back surface. That is, in FIGS. 1 and 2, a surface facing the upper side of the drawing is referred to as a front surface, and a surface facing the lower side of the drawing is referred to as a back surface. As for coordinate axes illustrated in FIG. 1, a direction from the back surface toward the front surface is a Z direction. Further, a surface facing in a direction orthogonal to the Z direction is referred to as a side surface. That is, surfaces facing in a ±X direction and a ±Y direction that are orthogonal to the Z direction are side surfaces. The liquid crystal display device 1 has a substantially rectangular shape in plan view, and a direction in which a longer side of the rectangular shape extends is the Y direction, and a shorter side of the rectangular shape extends is the X direction.

<Liquid Crystal Panel 11>

A liquid crystal panel 11 is shaped like a plate and includes two transparent substrates each having a rectangular shape, and a liquid crystal layer interposed between the two transparent substrates, the liquid crystal layer being liquid crystals enclosed by an enclosing material. The two transparent substrates are formed of glass, but may also be formed of other materials such as plastic. A plurality of electrodes are disposed on at least a portion of each of the two transparent substrates, the portion facing the liquid crystal layer. Further, a potential difference between the electrodes is controllable. As a potential difference is applied between the electrodes, the liquid crystals are aligned in a specific direction. Further, an aligning film may be provided on a surface of the transparent substrate, so that the liquid crystals are aligned in a certain direction in a case where a potential difference is not applied between the electrodes, the surface of the transparent substrate facing the liquid crystals. A spacer for keeping a distance between the two transparent substrates constant may be provided. The electrode may have any shape. For example, regular electrode patterns may be arranged in an array, or the electrode may an electrode pattern shaped like a geometric design, a character, a drawing, or the like. The liquid crystals may be aligned in various directions such as a vertical direction and a horizontal direction, but may be aligned in any direction. Further, a transistor element for controlling a potential difference between the electrodes may be provided. The liquid crystal panel 11 includes a polarizing plate provided on each of a front surface and a back surface thereof. The polarizing plate functions to polarize light transmitted in a thickness direction.

With the above-described configuration, the liquid crystal panel 11 can change a light transmittance by using an electric signal applied to the electrode.

<Lighting Device 12>

A lighting device 12 is shaped like a plate having substantially the same rectangular shape as that of the liquid crystal panel 11 when viewed from the front surface side of the lighting device 12. The lighting device 12 includes a light emitting region from which light is emitted and which is provided on a front surface of the lighting device 12. The lighting device 12 is provided on the back surface of the liquid crystal panel 11 to overlap with the liquid crystal panel 11.

The lighting device 12 can emit light to the front surface side. Since an intensity (brightness) of light emitted from the front surface of the liquid crystal panel 11 can be changed by transmitting light emitted from the lighting device 12 through the liquid crystal panel 11, the display device 1 can display a desired image.

Figure 3:
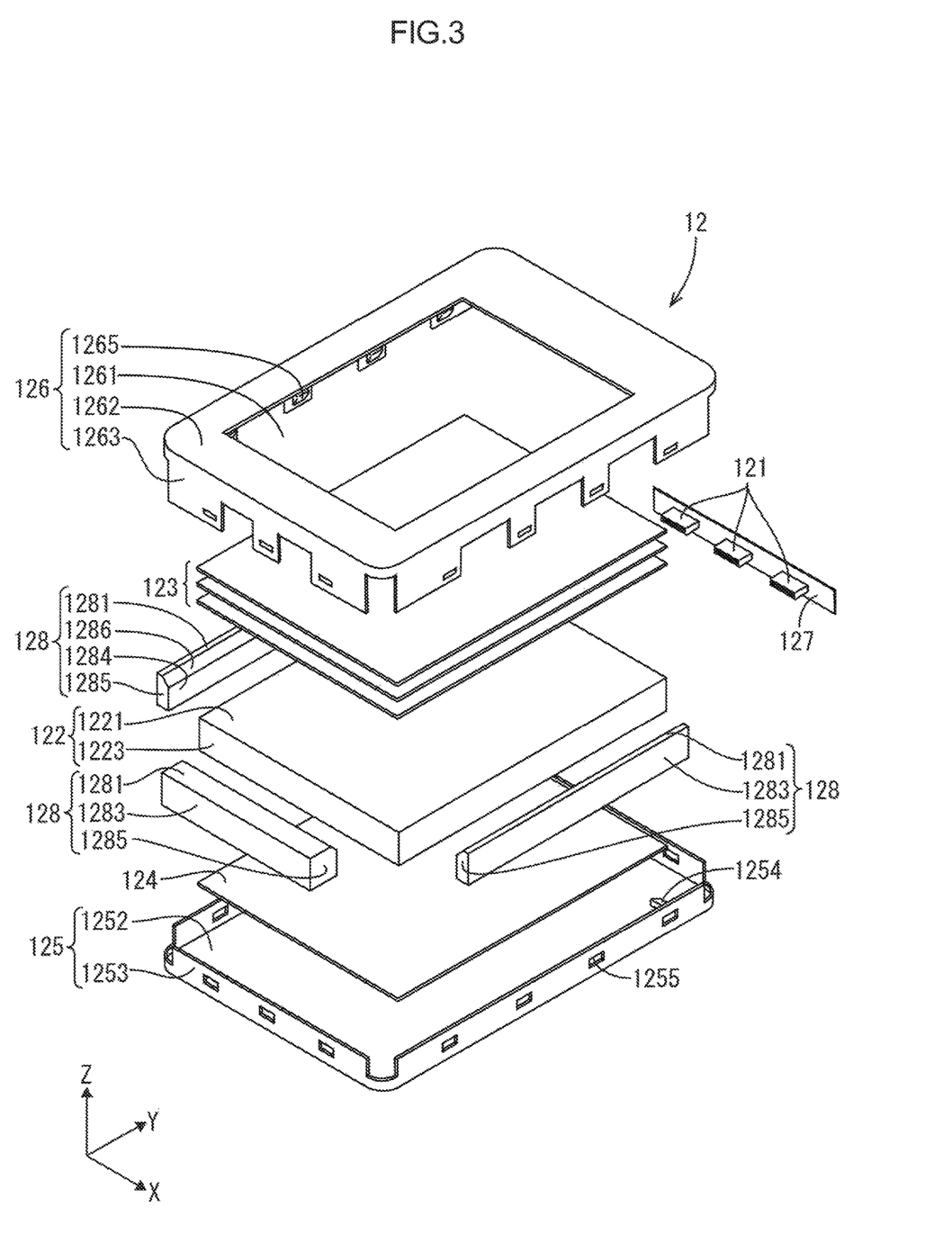
FIG. 3 is an exploded perspective view illustrating a lighting device according to an embodiment.
Figure 6:
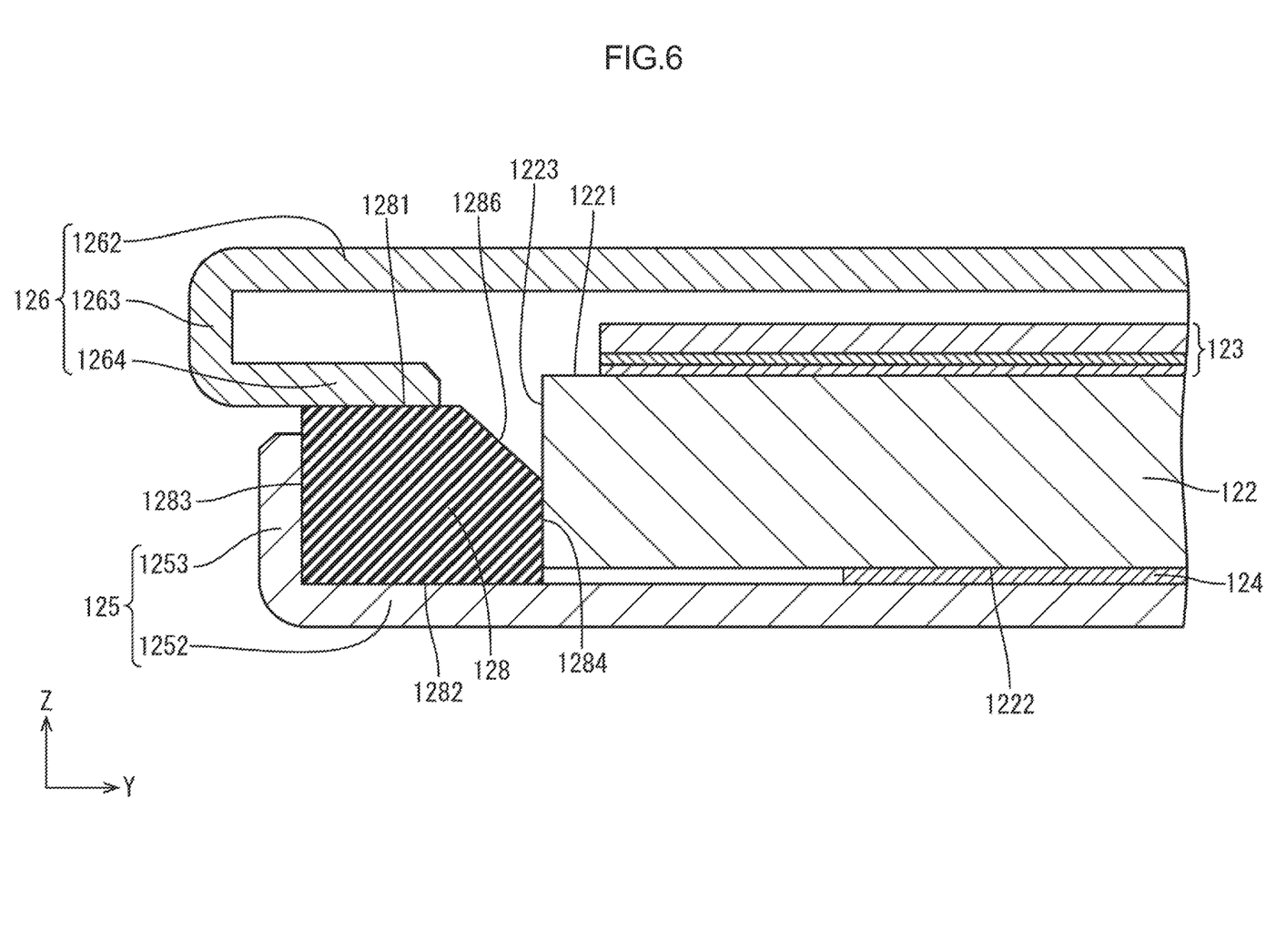
FIG. 6 is a cross-sectional view illustrating the lighting device according to an embodiment.

FIG. 3 is an exploded perspective view illustrating the lighting device 12. Further, FIG. 6 is a cross-sectional view illustrating an end portion of the lighting device 12. The lighting device 12 includes a light source 121, a light guide plate 122, optical sheets 123, a reflecting sheet (reflecting plate) 124, a lower frame 125, an upper frame 126, a light source substrate 127, and elastic members 128.

<Light Source 121>

The light source 121 converts electric energy into light to emit light. According to the present embodiment, the light source 121 is a light emitting diode (LED). Therefore, the lighting device 12 can achieve a high brightness with low power consumption. Note that the light source 121 may also be a light source other than the light emitting diode, such as an organic electroluminescent (EL) diode or a cold cathode fluorescent lamp (CCFL) tube. The number of light sources 121 may be one or more.

<Light Source Substrate 127>

The light source 121 is disposed on the light source substrate 127. The light source substrate 127 is configured to fix the light source 121 and supply power to the light source 121.

<Light Guide Plate 122>

The light guide plate 122 is shaped substantially like a plate, and a plate surface on the front surface side is a light emitting surface 1221. A plate surface on the back surface side is a counter light emitting surface 1222. Side surfaces 1223 each are a surface connecting the light emitting surface 1221 and the counter light emitting surface 1222 to each other. The total number of side surfaces 1223 is four. At least one of the side surfaces 1223 is a light incident surface. The light source 121 is disposed to face the light incident surface. The light guide plate 122 is mainly formed of a material having a high transparency, such as an acrylic resin or a polycarbonate resin. Light emitted from the light source 121 is incident on the light guide plate 122 through the light incident surface, and is emitted from the light emitting surface 1221. Note that the number of light incident surfaces may be more.

<Reflecting Sheet 124>

The reflecting sheet 124 is disposed on a back surface side of the light guide plate 122. A front surface of the reflecting sheet 124 is a white surface or a mirror surface, which serves to reflect light emitted from the counter light emitting surface 1222 of the light guide plate 122 to return the light into the light guide plate 122. Accordingly, it is possible to increase a brightness of the light emitted from the lighting device 12.

<Optical Sheet 123>

The optical sheets 123 are disposed on a front surface (upper side) of the light guide plate 122. The optical sheet is a thin plate giving a predetermined optical effect on transmitted light. The optical sheets 123 may be a prism sheet, a lens sheet, and a diffusing sheet. Alternatively, a plurality of layers of one or more of the prism sheet, the lens sheet, or the diffusing sheet may be stacked as the optical sheets 123. With such a configuration, it is possible to give a desired optical effect on the light emitted from the lighting device 12.

<Lower Frame 125>

The lower frame 125 is a box having an opened front surface. The lower frame 125 is disposed below the light guide plate 122 and has a bottom surface portion 1252 having a substantially planar shape parallel to the reflecting sheet 124, and a side surface portion 1253 vertically rising from an end portion of the bottom surface portion 1252. A plurality of openings 1255 engageable with the upper frame 126 are provided in the side surface portion 1253.

According to the present embodiment, the lower frame 125 is formed by performing sheet metal working such as bending and squeezing on a sheet metal formed of a metal material such as iron or aluminum. The lower frame 125 formed of the metal material is generally excellent in stiffness, heat radiation performance, and electromagnetic wave shielding performance.

Figure 4:
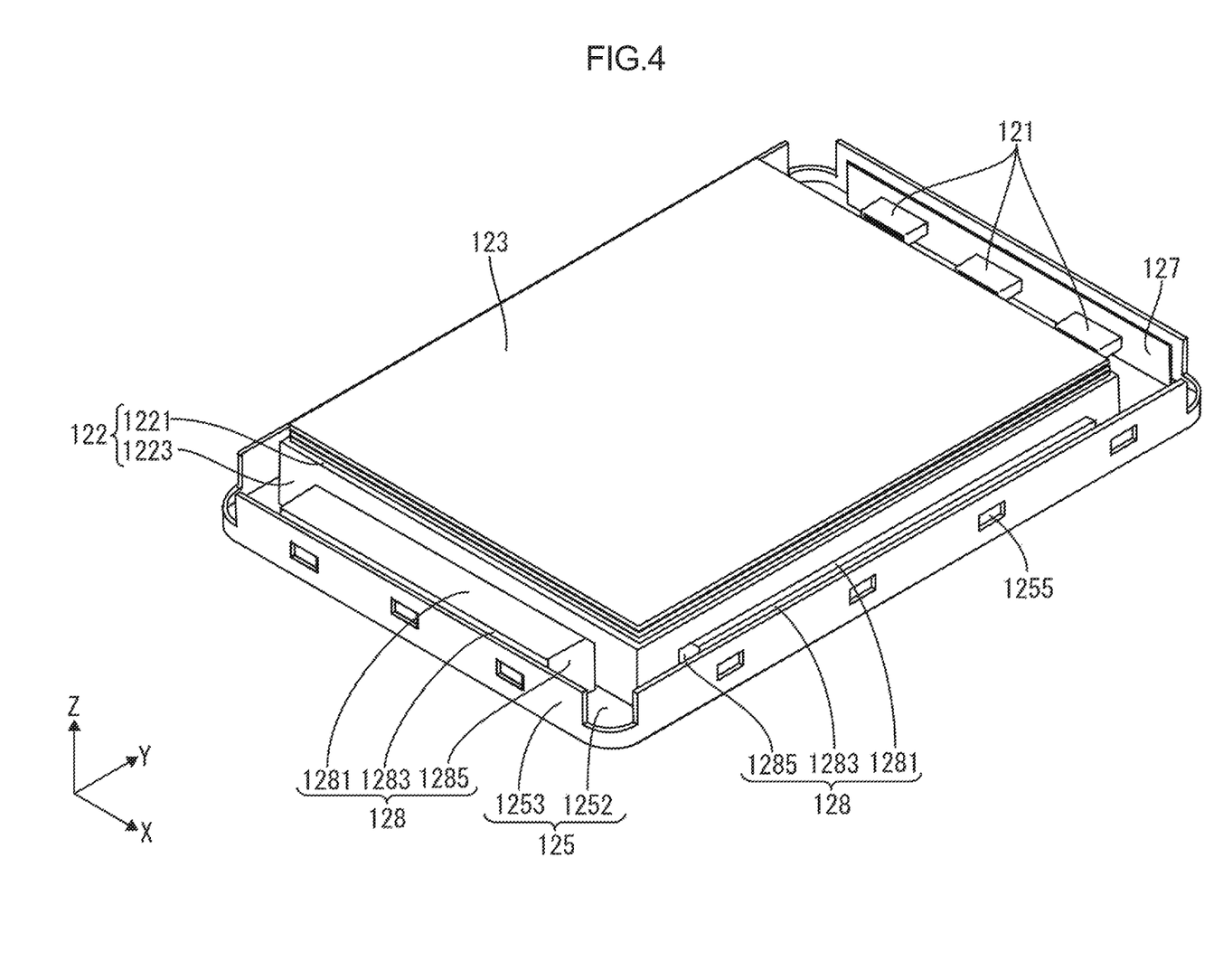
FIG. 4 is a perspective view illustrating a lighting device being assembled according to an embodiment.

FIG. 4 is a perspective view illustrating the lighting device 12 being assembled. FIG. 4 illustrates a state in which the light source 121, the light source substrate 127, the light guide plate 122, the reflecting sheet 124, the optical sheets 123, and the elastic members 128 are received in the lower frame 125.

The light source substrate 127 is fixed onto an inner side surface of the side surface portion 1253 of the lower frame 125 by using a double-sided tape or the like. With such a configuration, a layout of the lower frame 125 and the light source 121 is defined.

As illustrated in FIG. 3, a stopper 1254 protrudes from a front surface side (inner side) of the side surface portion 1253. The stopper 1254 can be in contact with the light incident surface of the light guide plate 122 to limit movement of the light guide plate 122 and prevent the light incident surface of the light guide plate 122 and the light source 121 from being excessively close to each other. Accordingly, it is possible to keep the light emitted from the lighting device 12 constant and optimal.

<Elastic Member 128>

As illustrated in FIGS. 3 and 4, the elastic member 128 having elasticity is disposed between each of the side surfaces 1223 which are not the light incident surface of the light guide plate 122, and the side surface portion 1253 of the lower frame 125. According to the present embodiment, three elastic members 128 are disposed along three side surfaces 1223, which are not the light incident surface, respectively, so as to be in contact with the three side surfaces 1223, respectively, and the number of elastic members 128 may be one or more. The elastic member 128 is a material having a Young's modulus lower than at least those of the light guide plate 122 and the lower frame 125, and is preferably rubber, urethane, foam rubber, urethane foam, or the like.

The elastic member 128 is formed to have a pentagonal prism shape by forming an inclined surface 1286 by chamfering a corner of a substantially rectangular parallelepiped having a top surface 1281, a bottom surface 1282 parallel to the top surface 1281, two side surfaces 1283 and 1284 parallel to each other, and two end surfaces 1285 parallel to each other, the corner connecting one side surface 1284 and the top surface 1281 to each other.

The elastic member 128 is disposed such that one side surface 1283 is in contact with the inner side surface of the side surface portion 1253 of the lower frame 125, and the other side surface 1284 is in contact with the side surface 1223 of the light guide plate. The elastic member is formed preferably such that a distance between one side surface 1283 and the other side surface 1284 of the elastic member 128 is slightly larger than a distance between the inner side surface of the side surface portion 1253 of the lower frame 125, and the side surface 1223 of the light guide plate. In this case, the elastic member 128 is inserted between the lower frame 125 and the light guide plate 122 while being compressed, so that the elastic member 128 continuously presses the light guide plate 122. Therefore, the light guide plate 122 does not shake in the lower frame 125.

It is preferable that the elastic member 128 be disposed so as to be in contact with the side surface 1223 that is opposite to the light incident surface. With such a configuration, the light guide plate 122 can be pressed by the elastic member 128 toward the light source 121, so that the stopper 1254 and the light incident surface of the light guide plate 122 closely adhere to each other, thereby making it possible to keep a distance between the light incident surface of the light guide plate 122 and the light source 121 constant. Accordingly, it is possible to keep the light emitted from the lighting device 12 constant and optimal.

The elastic member 128 is disposed such that the top surface 1281 of the elastic member 128 faces a front surface side of the lighting device 12 and the bottom surface 1282 is in contact with the bottom surface portion 1252 of the lower frame 125. In this case, the elastic member 128 may be disposed so as to be in contact with the front surface of the reflecting sheet 124. Further, it is preferable that the two end surfaces 1285 be not in contact with any member and spatial clearances are formed around the two end surfaces 1285, respectively. That is, it is preferable that a space be provided between an end surface (each end surface of the elastic member 128 in a direction in which the elastic member 128 extends along the side surface of the light guide plate 122) of each of the plurality of elastic members 128, and each of a top surface portion 1262, the bottom surface portion 1252, the side surface portion 1253 of the lower frame 125, and the light guide plate 122.

Further, the elastic member 128 is disposed closer to a back surface side of the lighting device 12 than a level of the optical sheet 123 is. In other words, the elastic member 128 is formed such that a height of the elastic member 128 is smaller than the sum of a thickness of the reflecting sheet 124 and a thickness of the light guide plate 122 (a distance between the top surface 1281 and the bottom surface 1282 is decreased) when the elastic member 128 is disposed directly on the bottom surface portion 1252 of the lower frame 125. The top surface 1281 of the elastic member 128 is positioned closer to the back surface side (lower side) of the lighting device 12 than the optical sheet 123 is.

<Upper Frame 126>

Figure 5:
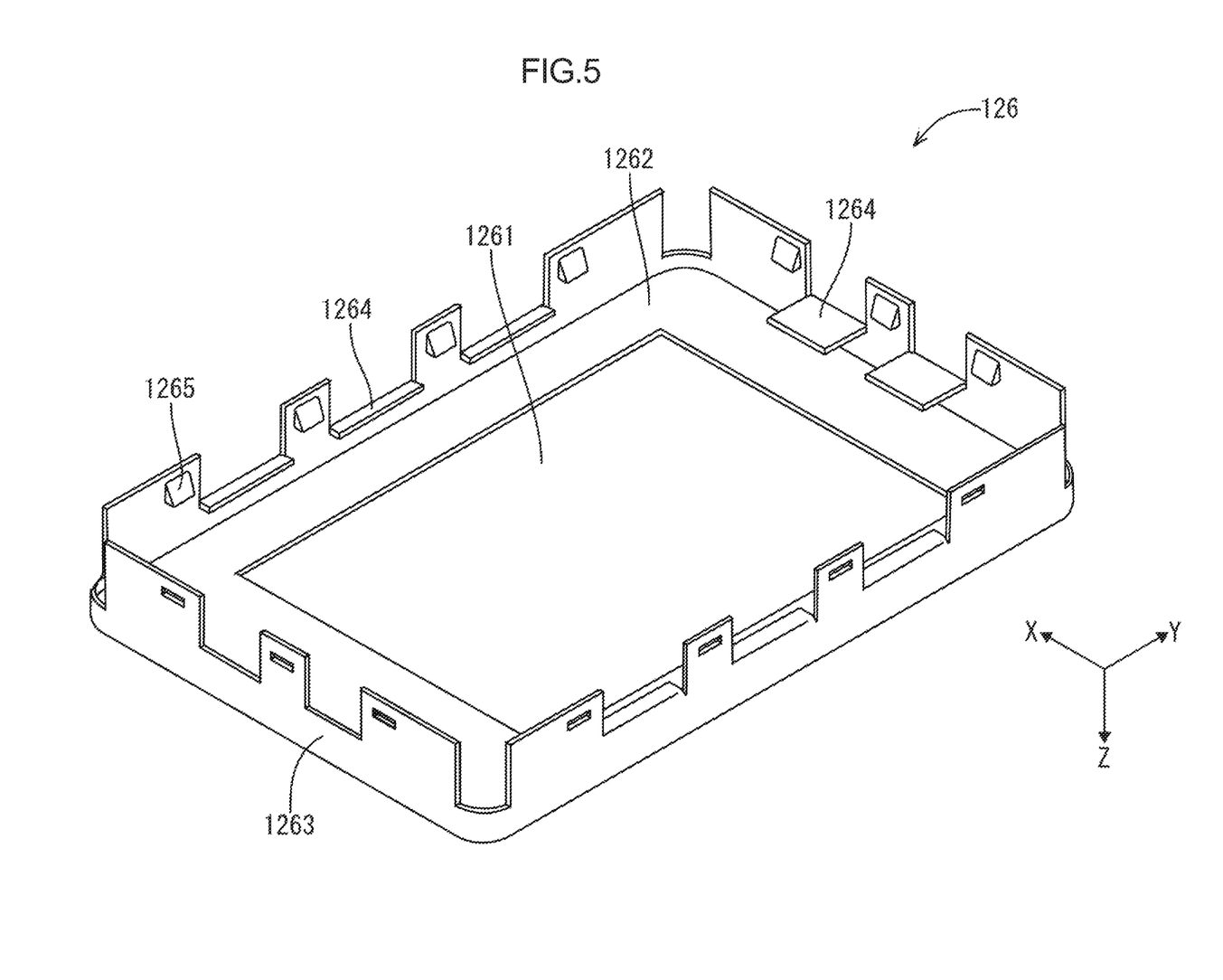
FIG. 5 is a perspective view illustrating an upper frame according to an embodiment when viewed from a back surface side.

As illustrated in FIGS. 5 and 6, the upper frame 126 has the top surface portion 1262 having a planar shape and facing the light emitting surface 1221 of the light guide plate 122, and a side surface portion 1263 extending (vertically rising to be a side surface of the upper frame 126) by being bent at a right angle from an end portion of the top surface portion 1262. The upper frame 126 is a box having an opened back surface. The upper frame 126 covers the lower frame 125 from the front surface side of the lighting device 12.

Projection portions 1265 that project inwardly are provided on the side surface portion 1263 of the upper frame. The opening 1255 (see FIG. 3) provided in the side surface portion 1253 of the lower frame 125 and the projection portion 1265 provided on the side surface portion 1263 of the upper frame are engaged with each other, so that the lower frame 125 and the upper frame 126 are engaged to each other to form one box. With such a configuration, the light source 121, the light source substrate 127, the light guide plate 122, the reflecting sheet 124, the optical sheets 123, and the elastic members 128 are received in the box constituted by the upper frame 126 and the lower frame 125.

An opening portion 1261 is provided at the center of the top surface portion 1262 of the upper frame 126 to expose an optical sheet 123 that is closest to the front surface side of the lighting device 12. Almost half of light emitted from the light source 121 is emitted toward the outside of the lighting device 12 through the opening portion 1261.

The upper frame 126 includes at least one pressing portion 1264 extending inwardly (toward the light guide plate 122) from an end portion of the side surface portion 1263 while being in parallel with the top surface portion 1262. It can also be said that the pressing portion 1264 has a shape bent inwardly from the side surface portion 1263. A clearance is provided between the top surface portion 1262 and the pressing portion 1264.

As illustrated in FIG. 6, the top surface 1281 of the elastic member 128, and a surface of the pressing portion 1264 that faces the back surface side of the lighting device 12 are in contact with each other in a state in which the lower frame 125 and the upper frame 126 are engaged with each other. With such a configuration, the elastic member 128 is surrounded by the light guide plate 122, the pressing portion 1264, and the bottom surface portion 1252 and the side surface portion 1253 of the lower frame 125.

According to the present embodiment, the upper frame 126 is formed by performing sheet metal working such as bending and squeezing on a sheet metal formed of a metal material such as iron or aluminum. The lower frame 125 formed of the metal material is generally excellent in stiffness, heat radiation performance, and electromagnetic wave shielding performance.

Further, it is preferable that the pressing portion 1264 be also formed by performing bending processing on a sheet metal. The pressing portion 1264 can be easily formed in a case of using the bending processing.

<Effects of Present Embodiment>

According to the present embodiment, the lighting device 12 includes:

the light source 121;

the light guide plate 122 having the light emitting surface 1221 from which light from the light source 121 is emitted, and the counter light emitting surface 1222 disposed opposite to the light emitting surface 1221;

the lower frame 125 having the bottom surface portion 1252, and the side surface portion 1253 connected to the bottom surface portion 1252 and receiving the light source 121 and the light guide plate 122 therein;

the upper frame 126 having the top surface portion 1262 facing the light emitting surface 1221 of the light guide plate 122, and the side surface portion 1263 connected to the top surface portion 1262, and engaged with the lower frame 125; and the elastic member 128 disposed between the side surface 1223 of the light guide plate 122 and the side surface portion 1253 of the lower frame 125.

The elastic member 128 is disposed closer to the bottom surface portion 1252 than the optical sheets 123 are, the upper frame 126 includes the pressing portion 1264 extending toward the light guide plate 122 from the end portion of the side surface portion 1263 of the upper frame 126, the elastic member 128 is disposed between the pressing portion 1264 and the bottom surface portion 1252, and a clearance is formed between the top surface portion 1262 and the pressing portion 1264.

In a case where a temperature of the light guide plate 122 is high, the light guide plate 122 expands, and as a result, the distance between the side surface 1223 of the light guide plate 122 and the side surface portion 1253 of the lower frame 125 is decreased. The elastic member 128 is disposed between the side surface 1223 of the light guide plate 122 and the side surface portion 1253 of the lower frame 125, therefore, the elastic member 128 is compressed and deformed such that a distance between the side surface 1284 and the side surface 1283 is decreased.

The elastic member 128 tends to be deformed so as to maintain a volume thereof. Therefore, the elastic member 128 tends to expand such that the top surface 1281 pushes up the pressing portion 1264 of the upper frame 126 toward the front surface side of the lighting device 12. Since the clearance is formed between the top surface portion 1262 and the pressing portion 1264, the pressing portion 1264 functions as a leaf spring and can be deformed upward such that the clearance is decreased. With such a configuration, the elastic member 128 may expand toward the front surface side of the lighting device 12.

Therefore, it is possible to prevent the top surface portion 1262 and the side surface portion 1263 of the upper frame 126 from being deformed. Further, it is possible to prevent application of an excessive pressure to the elastic member 128.

In the lighting device 12 according to the present embodiment, the side surface portion 1263 of the upper frame 126 extends by being bent at a right angle from the end portion of the top surface portion 1262, and the pressing portion 1264 extends by being bent at a right angle from the end portion of the side surface portion 1263 of the upper frame 126.

With such a configuration, it is possible to form the side surface portion 1263 perpendicular to the top surface portion 1262. Further, it is possible to form the pressing portion 1264 parallel to the top surface portion 1262.

In the lighting device 12 according to the present embodiment, the elastic member 128 is disposed closer to the bottom surface portion 1252 than the optical sheets 123 are, and thus even when the elastic member 128 expands toward the front surface side of the lighting device 12, the elastic member 128 hardly comes into contact with the optical sheet 123, and it is possible to prevent uneven brightness and occurrence of moire caused by deformation of the elastic member 128 occurring when the optical sheet 123 comes into contact with the elastic member 128.

In the lighting device 12 according to the present embodiment, the elastic member 128 has the inclined surface 1286 formed between the side surface 1284 facing the light guide plate 122 and the top surface 1281 facing the pressing portion 1264. With such a configuration, the elastic member 128 hardly comes into contact with the optical sheet 123 even when the elastic member 128 expands toward the front surface side of the lighting device 12, and it is possible to prevent uneven brightness and occurrence of moire caused by deformation of the elastic member 128 occurring when the optical sheet 123 comes into contact with the elastic member 128.

In the lighting device 12 according to the present embodiment, a spatial clearance is formed around the inclined surface 1286 of the elastic member 128, the inclined surface 1286 being not in contact with any of the top surface portion 1262, the bottom surface portion 1252, the side surface portion 1253 of the lower frame, and the light guide plate 122. With such a configuration, the elastic member 128 can expand from the inclined surface 1286, so that it is possible to prevent the top surface portion 1262 and the side surface portion 1263 of the upper frame 126 from being deformed. Further, it is possible to prevent application of an excessive pressure to the elastic member 128.

In the lighting device 12 according to the present embodiment, the pressing portion 1264 is formed by performing bending processing on a sheet metal. With such a configuration, it is possible to easily form the pressing portion 1264 having an appropriate stiffness, elasticity, and durability as a leaf spring.

In the lighting device 12 according to the present embodiment, at least one side surface 1223 of the light guide plate 122 is the light incident surface on which the light from the light source 121 is incident, and the light source 121 is disposed to face the light incident surface. With such a configuration, it is possible to decrease a thickness of the lighting device 12.

In the lighting device 12 according to the present embodiment, the stopper 1254 limiting the distance between the light source 121 and the light incident surface is provided on the lower frame 125, and the elastic member 128 is disposed to be in contact with the side surface 1223 disposed opposite to the light incident surface. The stopper 1254 can be in contact with the light incident surface of the light guide plate 122 to limit movement of the light guide plate 122 and prevent the light incident surface of the light guide plate 122 and the light source 121 from being excessively close to each other.

Further, the light guide plate 122 can be pressed by the elastic member 128 toward the light source 121, so that the stopper 1254 and the light guide plate 122 closely adhere to each other, thereby making it possible to keep a distance between the light incident surface of the light guide plate 122 and the light source 121 constant. Accordingly, it is possible to keep the light emitted from the lighting device 12 constant and optimal.

Note that a stopper may be disposed on the upper frame 126, instead of disposing the stopper 1254 on the lower frame 125.

In the lighting device 12 according to the present embodiment, the elastic member 128 is any one of rubber, urethane, foam rubber, or urethane foam. The rubber and the urethane each have a Young's modulus lower than those of the light guide plate 122 and the lower frame 125, so that it is possible to prevent the light guide plate 122, the lower frame 125, and the upper frame 126 from being deformed or damaged when the light guide plate 122 expands. Further, since the rubber and the urethane are softer than the light guide plate 122, it is possible to prevent a surface of the light guide plate 122 from being damaged. Further, in a case where the elastic member 128 is a foam material, a volume of the elastic member 128 can be changed, so that it is possible to further prevent the light guide plate 122, the lower frame 125, and the upper frame 126 from being deformed or damaged.

In the lighting device 12 according to the present embodiment, the optical sheets 123 each are any one of a prism sheet, a lens sheet, or a diffusing sheet, or are formed by stacking a plurality of layers of one or more of the prism sheet, the lens sheet, or the diffusing sheet. With such a configuration, it is possible to give a desired optical effect on the light emitted from the lighting device 12.

In the lighting device 12 according to the present embodiment, the light source 121 is a light emitting diode. Therefore, the lighting device 12 can achieve a high brightness with low power consumption.

In the lighting device 12 according to the present embodiment, the light emitting diode is disposed on the light source substrate 127, and the light source substrate 127 is fixed onto the lower frame 125. With such a configuration, a layout of the lower frame 125 and the light source 121 is defined.

The lighting device 12 according to the present embodiment includes the reflecting plate 124 disposed on the back surface of the light guide plate 122. The light emitted from the counter light emitting surface 1222 of the light guide plate 122 can be reflected and returned into the light guide plate 122, so that it is possible to improve brightness of the light emitted from the lighting device 2.

In the lighting device 12 according to the present embodiment, the surface of the reflecting plate 124 that faces the light guide plate 122 is a white surface or a mirror surface. With such a configuration, more light emitted from the counter light emitting surface 1222 of the light guide plate 122 can be reflected and returned into the light guide plate 122, so that it is possible to further improve brightness of the light emitted from the lighting device 2.

In the lighting device 12 according to the present embodiment, the light guide plate 122 is mainly formed of an acrylic resin or a polycarbonate resin. The acrylic resin or the polycarbonate resin has a high transparency, and injection molding thereof with high precision may be easily performed, so that it is possible to emit uniform light with a high brightness.

The liquid crystal display device 1 according to the present embodiment includes the lighting device 12. The lighting device 12 is disposed on a back surface side of the liquid crystal panel 11. With such a configuration, it is possible to prevent or reduce deformation of the liquid crystal display device 1 that is caused by temperature variation.

The invention claimed is:

1. A lighting device comprising:
   a light source;
   a light guide plate having one plate surface as a light emitting surface from which light from the light source is emitted, and another plate surface as a back surface, the other surface being disposed opposite to the light emitting surface;
   a lower frame having a bottom surface portion and a side surface portion rising from the bottom surface portion, and receiving the light source and the light guide plate therein;
   an upper frame having a top surface portion facing the light emitting surface of the light guide plate, and a side surface portion rising from the top surface portion, and engaged with the lower frame; and
   an elastic member disposed between a side surface of the light guide plate and the side surface portion of the lower frame,
   wherein
   the upper frame includes a pressing portion extending toward the light guide plate from an end portion of the side surface portion of the upper frame,
   the elastic member is disposed between the pressing portion and the bottom surface portion,
   a clearance is formed between the top surface portion and the pressing portion, and
   the side surface portion of the upper frame extends by being bent at a right angle from an end portion of the top surface portion, and the pressing portion extends by being bent at a right angle from the end portion of the side surface portion of the upper frame.

2. The lighting device according to claim 1, further comprising:
   optical sheets disposed on the light emitting surface side of the light guide plate,
   wherein the elastic member is disposed closer to the bottom surface portion than the optical sheets are.

3. The lighting device according to claim 1, wherein the elastic member has an inclined surface formed between a surface facing the light guide plate and a surface facing the pressing portion.

4. A lighting device comprising:
a light source;
a light guide plate having one plate surface as a light emitting surface from which light from the light source is emitted, and another plate surface as a back surface, the other surface being disposed opposite to the light emitting surface;
a lower frame having a bottom surface portion and a side surface portion rising from the bottom surface portion, and receiving the light source and the light guide plate therein;
an upper frame having a top surface portion facing the light emitting surface of the light guide plate, and a side surface portion rising from the top surface portion, and engaged with the lower frame; and
an elastic member disposed between a side surface of the light guide plate and the side surface portion of the lower frame,
wherein
the upper frame includes a pressing portion extending toward the light guide plate from an end portion of the side surface portion of the upper frame,
the elastic member is disposed between the pressing portion and the bottom surface portion,
a clearance is formed between the top surface portion and the pressing portion, and
the elastic member extends along the side surface of the light guide plate, and a space is formed between an end portion of the elastic member in a direction in which the elastic member extends, and each of the top surface portion, the bottom surface portion, the side surface portion of the lower frame, and the light guide plate.

5. The lighting device according to claim 1, wherein the pressing portion is formed of a sheet metal.

6. The lighting device according to claim 1, wherein at least one side surface of the light guide plate is a light incident surface on which the light from the light source is incident, and the light source is disposed to face the light incident surface.

7. A lighting device comprising:
a light source;
a light guide plate having one plate surface as a light emitting surface from which light from the light source is emitted, and another plate surface as a back surface, the other surface being disposed opposite to the light emitting surface;
a lower frame having a bottom surface portion and a side surface portion rising from the bottom surface portion, and receiving the light source and the light guide plate therein;
an upper frame having a top surface portion facing the light emitting surface of the light guide plate, and a side surface portion rising from the top surface portion, and engaged with the lower frame; and
an elastic member disposed between a side surface of the light guide plate and the side surface portion of the lower frame,
wherein
the upper frame includes a pressing portion extending toward the light guide plate from an end portion of the side surface portion of the upper frame,
the elastic member is disposed between the pressing portion and the bottom surface portion,
a clearance is formed between the top surface portion and the pressing portion,
at least one side surface of the light guide plate is a light incident surface on which the light from the light source is incident, and the light source is disposed to face the light incident surface, and
the lower frame or the upper frame has a stopper formed thereon, the stopper limiting a distance between the light source and the light incident surface, and the elastic member is disposed to be in contact with a surface disposed opposite to the light incident surface.

8. The lighting device according to claim 1, wherein the elastic member is any one of rubber, urethane, foam rubber, or urethane foam.

9. The lighting device according to claim 1, further comprising:
optical sheets disposed on the light emitting surface side of the light guide plate,
wherein the optical sheets each are any one of a prism sheet, a lens sheet, or a diffusing sheet, or are formed by stacking a plurality of layers of one or more of the prism sheet, the lens sheet, or the diffusing sheet.

10. The lighting device according to claim 1, wherein the light source is a light emitting diode.

11. The lighting device according to claim 10, wherein the light emitting diode is disposed on a light source substrate, and the light source substrate is fixed onto the lower frame.

12. The lighting device according to claim 11, further comprising:
a reflecting plate disposed on a back surface of the light guide plate.

13. The lighting device according to claim 12, wherein the reflecting plate has a white surface or a mirror surface disposed to face the light guide plate.

14. The lighting device according to claim 1, wherein the light guide plate is mainly formed of an acrylic resin or a polycarbonate resin.

15. A liquid crystal display device comprising:
a liquid crystal panel; and
the lighting device according to claim 1,
wherein the lighting device is disposed on a back surface side of the liquid crystal panel.

* * * * *